United States Patent
Tang et al.

(10) Patent No.: US 10,333,815 B2
(45) Date of Patent: Jun. 25, 2019

(54) REAL-TIME DETECTION OF ABNORMAL NETWORK CONNECTIONS IN STREAMING DATA

(71) Applicant: NEC Laboratories America, Inc., Princeton, NJ (US)

(72) Inventors: LuAn Tang, Pennington, NJ (US); Zhengzhang Chen, Princeton Junction, NJ (US); Haifeng Chen, West Windsor, NJ (US); Kenji Yoshihira, Princeton Junction, NJ (US); Guofei Jiang, Princeton, NJ (US)

(73) Assignee: NEC Corporation, Tokyo (JP)

( * ) Notice: Subject to any disclaimer, the term of this patent is extended or adjusted under 35 U.S.C. 154(b) by 297 days.

(21) Appl. No.: 15/413,812

(22) Filed: Jan. 24, 2017

(65) Prior Publication Data
US 2017/0272344 A1   Sep. 21, 2017

Related U.S. Application Data

(60) Provisional application No. 62/309,543, filed on Mar. 17, 2016.

(51) Int. Cl.
| | |
|---|---|
| *H04L 12/26* | (2006.01) |
| *H04L 29/08* | (2006.01) |
| *H04L 12/24* | (2006.01) |
| *G06F 11/34* | (2006.01) |

(52) U.S. Cl.
CPC .......... *H04L 43/10* (2013.01); *G06F 11/3438* (2013.01); *H04L 41/12* (2013.01); *H04L 41/16* (2013.01); *H04L 41/22* (2013.01); *H04L 41/28* (2013.01); *H04L 43/06* (2013.01); *H04L 43/0811* (2013.01); *H04L 67/22* (2013.01)

(58) Field of Classification Search
CPC . H04L 41/12–147; H04L 41/22; H04L 43/00; H04L 43/026; H04L 43/04–0817; H04L 43/0876–106; H04L 47/00; H04L 67/22; G06F 11/3438
See application file for complete search history.

(56) References Cited

U.S. PATENT DOCUMENTS

| | | | | |
|---|---|---|---|---|
| 5,590,120 A | * | 12/1996 | Vaishnavi | H04L 41/085 370/252 |
| 5,883,621 A | * | 3/1999 | Iwamura | H04L 12/40078 348/E5.103 |
| 2002/0032761 A1 | * | 3/2002 | Aoyagi | H04L 12/462 709/223 |
| 2005/0219151 A1 | * | 10/2005 | Li | H04L 41/22 345/7 |
| 2007/0209074 A1 | * | 9/2007 | Coffman | G06F 21/552 726/23 |
| 2008/0049779 A1 | * | 2/2008 | Hopmann | H04L 12/2807 370/431 |

(Continued)

*Primary Examiner* — Brendan Y Higa
(74) *Attorney, Agent, or Firm* — Joseph Kolodka

(57) ABSTRACT

A computer-implemented method for real-time detecting of abnormal network connections is presented. The computer-implemented method includes collecting network connection events from at least one agent connected to a network, recording, via a topology graph, normal states of network connections among hosts in the network, and recording, via a port graph, relationships established between host and destination ports of all network connections.

17 Claims, 6 Drawing Sheets

(56) References Cited

U.S. PATENT DOCUMENTS

| | | | |
|---|---|---|---|
| 2008/0148398 A1* | 6/2008 | Mezack | G06F 21/55 |
| | | | 726/22 |
| 2010/0315975 A1* | 12/2010 | Arkin | H04L 12/413 |
| | | | 370/254 |
| 2016/0127250 A1* | 5/2016 | McCormick | H04L 47/283 |
| | | | 370/235 |
| 2016/0219066 A1* | 7/2016 | Vasseur | H04L 63/1425 |
| 2016/0344571 A1* | 11/2016 | Marvin | H04L 12/4641 |
| 2017/0359238 A1* | 12/2017 | Hughes | H04L 43/062 |

* cited by examiner

REAL-TIME DETECTION OF ABNORMAL NETWORK CONNECTIONS IN STREAMING DATA

RELATED APPLICATION INFORMATION

This application claims priority to Provisional Application No. 62/309,543, filed on Mar. 17, 2016, incorporated herein by reference in its entirety.

BACKGROUND

Technical Field

The present invention relates to enterprise networks and, more particularly, to a system and method for real-time detection of abnormal network connections in streaming data.

Description of the Related Art

A typical enterprise network contains hundreds, even thousands of hosts, e.g., servers, desktops, laptops, etc. A single host may generate hundreds of network connections in a second. The total data volume in a middle-sized enterprise network can easily reach terabyte scale in a few hours. Enterprise networks have huge complexity in network structure and the contained entities, and both are evolving over time. The system needs to track the changes and always maintain the model. In security-oriented missions (e.g., intrusion detection), the response time is a critical issue. Many security actions have to be implemented in a short period of time to stop the damage. Thus, the system is required to process the data and detect abnormal connections in real time.

The training data are hard to get in the real applications. It is costly and error-prone to manually label the large dataset of network connections. In addition, the users usually have no knowledge about the abnormal connection patterns and can hardly define any useful models in advance. However, the end users are not satisfied by only being informed of the abnormal network connections. The users also want to know the reason for the abnormal connection in order to implement actions to solve the issues. For example, if the system reports that the connection is abnormal because an unseen process connects via a port which is used by an ftp protocol, then the users may investigate the ftp server to, e.g., cut the connection.

SUMMARY

A computer-implemented method for real-time detecting of abnormal network connections is presented. The method includes collecting network connection events from at least one agent connected to a network, recording, via a topology graph, normal states of network connections among hosts in the network, and recording, via a port graph, relationships established between host and destination ports of all network connections.

A system for real-time detecting of abnormal network connections is presented. The system includes a memory and a processor in communication with the memory, wherein the processor is configured to collect network connection events from at least one agent connected to a network, record, via a topology graph, normal states of network connections among hosts in the network, and record, via a port graph, relationships established between host and destination ports of all network connections.

A non-transitory computer-readable storage medium comprising a computer-readable program for real-time detecting of abnormal network connections is presented, wherein the computer-readable program when executed on a computer causes the computer to perform the steps of collecting network connection events from at least one agent connected to a network, recording, via a topology graph, normal states of network connections among hosts in the network, and recording, via a port graph, relationships established between host and destination ports of all network connections.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In the exemplary embodiments, a Graph-based Security Monitoring Engine (GSME) is introduced to monitor the enterprise network and detect abnormal connections. The core of GSME is a blue print graph model. This model has two kinds of blue print graphs: (1) the topology graph that records the normal states of network connections among the hosts in the enterprise network, and (2) the port graph that records the relationship of the process that initializes the connection with the destination ports. Both graphs are constructed via streaming big data and are maintained dynamically. When a new network connection arrives, the system checks the blue print graph and calculates the connecting probability (i.e., how likely such a connection is established). If the connecting probability is low, the connection is reported as abnormal to end users. The engine also provides explanations of the abnormal connection based on the blue print graph model.

The proposed method further detects abnormal network connections of enterprise networks in real time. The proposed method does not need any information in advance (e.g., training datasets, pre-defined models, etc.). Thus, it is more feasible for the real deployment scenario that the end users do not know the network very well. Moreover, the proposed method detects the abnormal connections in real time and the system maintains the models over the streaming of big data and uses them for detection simultaneously. The detection is made as soon as the engine receives that connection event. Further, the proposed method is more accurate (higher quality) on abnormal network connection detection.

Figure 1:
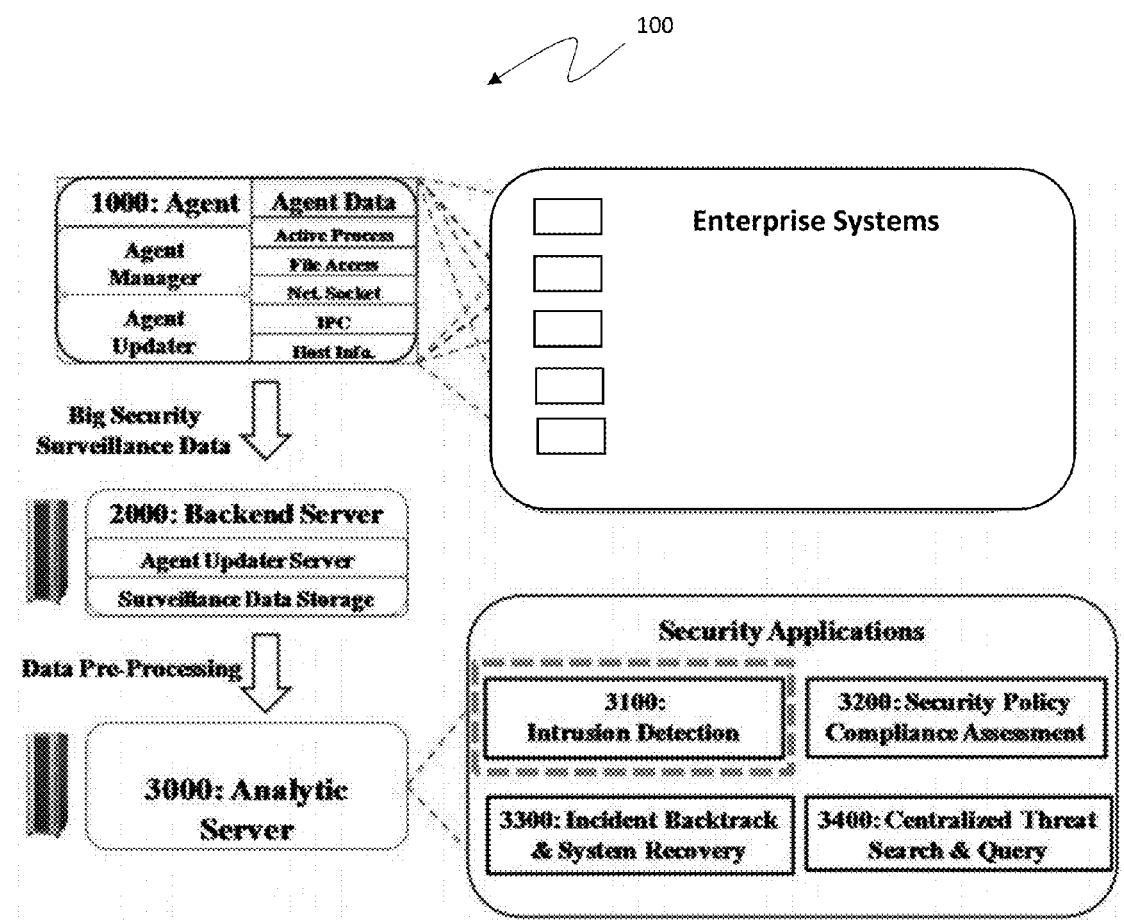
FIG. 1 is an example architecture of an automatic security intelligence system, in accordance with embodiments of the present invention.

FIG. 1 shows the overall architecture 100 of the Automatic Security Intelligence (ASI) system. There are three major components: (1) the agent 1000 is installed in each host of the enterprise network to collect operational data; (2) the backend servers 2000 receive the data from agents, pre-process them and send such processed data to the analysis server; and (3) the analysis server 3000 runs the security application programs to analyze the data. The intrusion detection engine 3100 is a major application to detect any possible intrusion from sources inside/outside the enterprise network. The technique of this invention is integrated in the intrusion detection engine.

Figure 2:
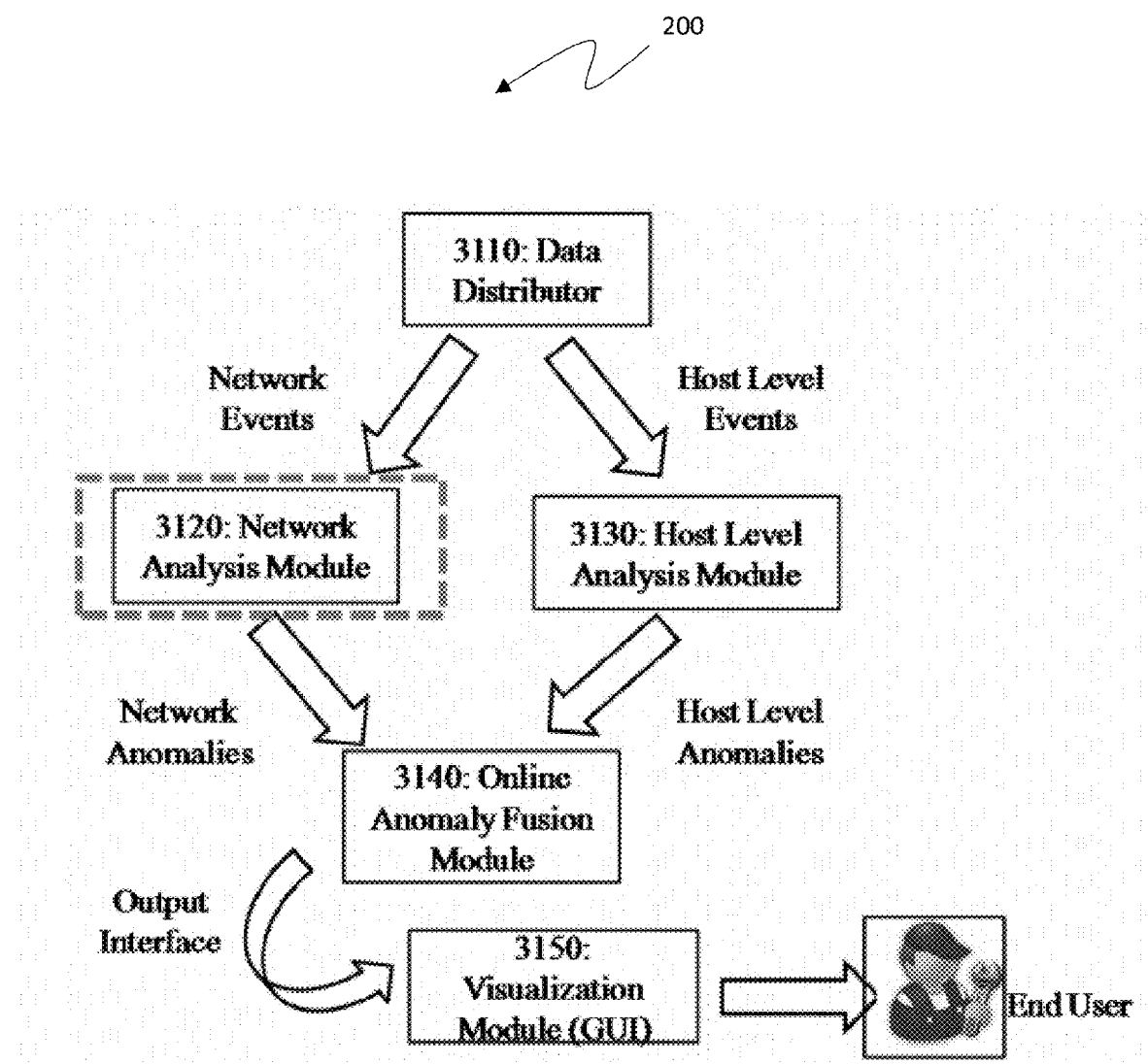
FIG. 2 is an example architecture of an intrusion detection engine, in accordance with embodiments of the present invention.

FIG. 2 shows the architecture 200 of an intrusion detection engine. There are five modules in the engine. (1) The data distributor 3110 that receives the data from the backend server and distributes the corresponding data to a network or host level modules. (2) The network analysis module 3120 that processes the network connection events (including TCP (transmission control protocol) and UDP (user datagram protocol)) and detects the abnormal connections. (3) The host level analysis module 3130 that processes the host level events, including user-to-process, process-to-file, user-to-registry, etc. The abnormal host level events are then generated. (4) The anomaly fusion module 3140 that integrates the network and host level anomalies and refines the results for trustworthy intrusion events. (5) The visualization module 3150 that outputs the detection results to end users. The technique of this invention serves as the main part of network analysis module 3120.

Figure 3:
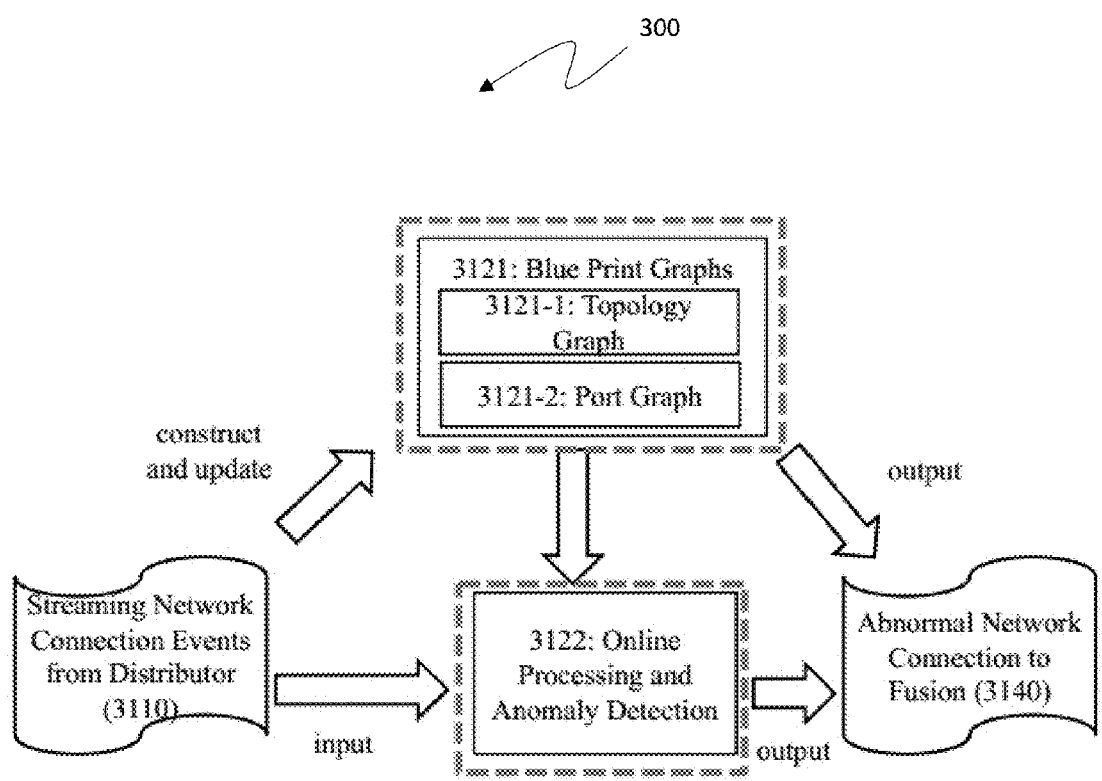
FIG. 3 is an example architecture of a network analysis module, in accordance with embodiments of the present invention.

FIG. 3 illustrates the architecture 300 of the network analysis module. There are two major components: (1) the blue print graph model 3121, which is a relationship model constructed and updated on the streaming network connection events from 3110; and (2) the online processing component that takes the network connections as input, conducts analysis based on the blue print graphs, and outputs the detected abnormal network connections to 3140.

Figure 6:
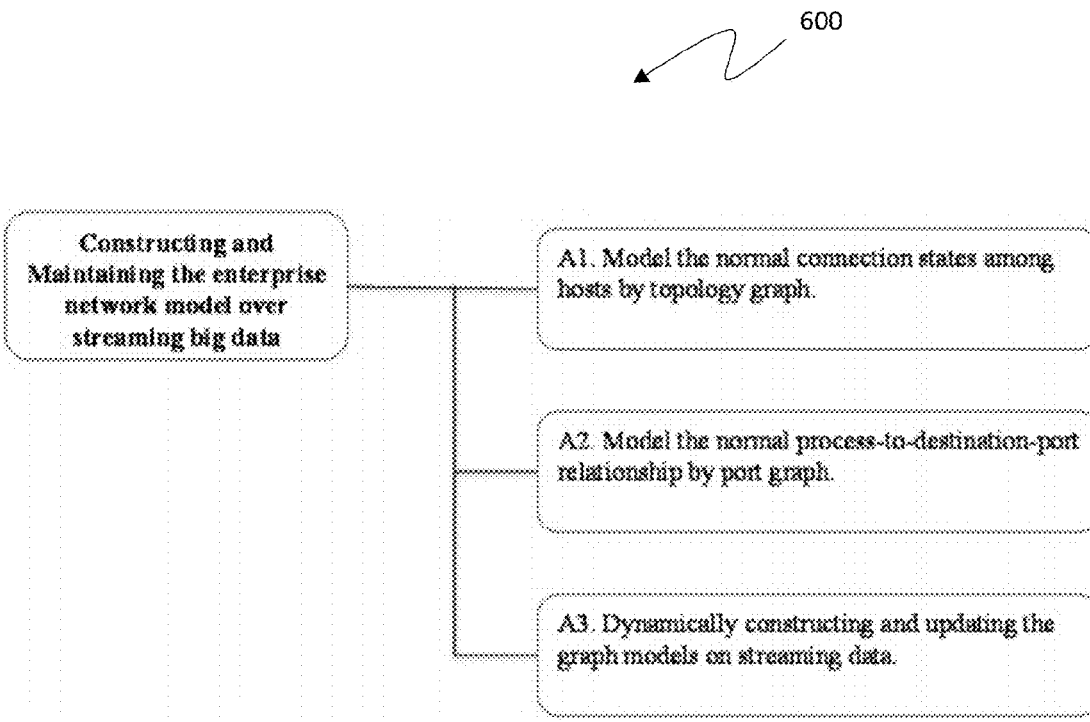
FIG. 6 is a block/flow diagram illustrating a method of implementing a blue print graph model, in accordance with embodiments of the present invention.
Figure 7:
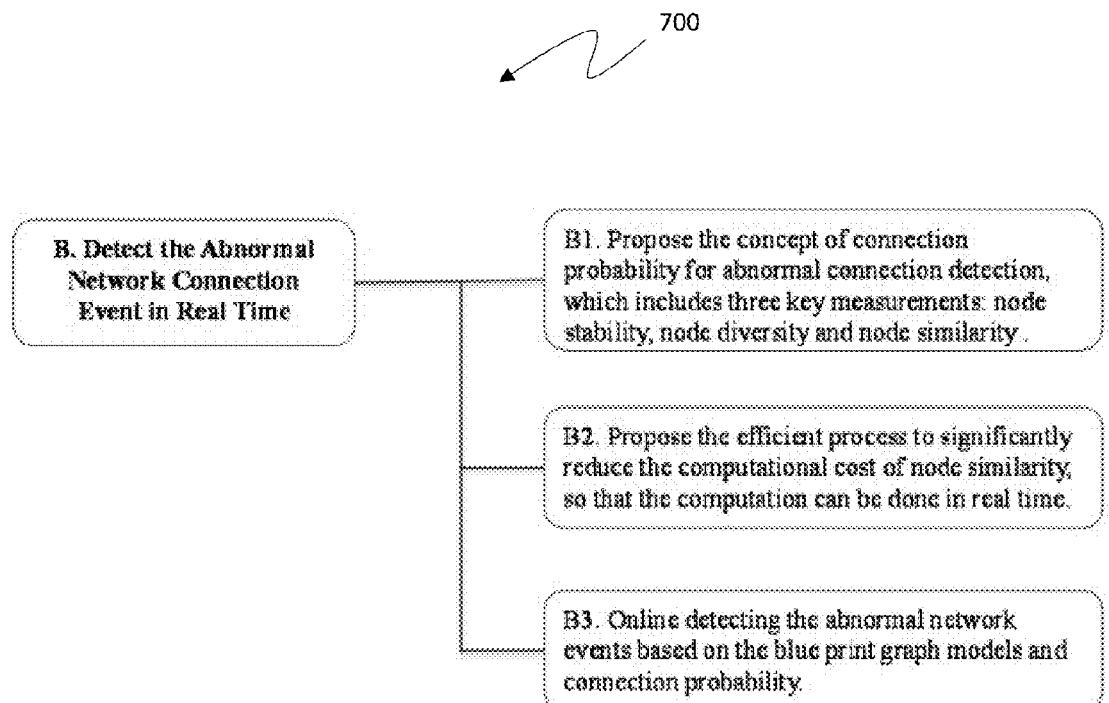
FIG. 7 is a block/flow diagram illustrating a method of detecting abnormal network connections, in accordance with embodiments of the present invention.

The main techniques of this invention are in the two parts of 3121 and 3122. They solve the following issues with the conventional art:
(1) How to construct a model to profile the normal states of an enterprise network? (Solved by 3121; FIG. 6)
(2) How to detect the abnormal network connections based on the normal state model? (Solved by 3122; FIG. 7)

Constructing and maintaining the enterprise network model over streaming big data (3121) is now described. A flowchart 600 (FIG. 6) summarizes such process.

The ASI agents are installed on the hosts of the enterprise network, and they collect all the network connection events and send them to the analysis server. A network event contains the following information.

Definition 1 (Network Event). A network connection event e is a 7-tuple, e=<src_ip, src_port, dst_ip, dst_port, connecting_process, protocol_num, timestamp>, where src_ip and src_port are the IP address and port of the source host, dst_ip and dst_port are the IP and port of the destination host, connecting_process is the process that initializes the connection, protocol_num indicates the protocol of the connection, and timestamp records the connection time.

Note that, the ASI agent is light-weight software. To reduce the workload and maintain privacy, the agent does not collect the content and traffic size of the network connections. Such information is thus not available for the system to analyze.

In a first example, Table 1 below illustrates a list of network event samples from 11:30 am to 12:05 am in 2016-2-29. These network events can be classified to two (2) categories based on the dst_ip: if the dst_ip is in the range of enterprise network's IP addresses (138.15.xx.xx), the network event is an inside connection between two hosts of the enterprise network. If the dst_ip is not in the range, it is an outside connection between an internal host and an external host.

In Table 1 below, $e_1$, $e_3$, $e_5$ and $e_6$ are inside connections and $e_2$ and $e_4$ are outside connections.

TABLE 1

List of Network Events

| Event | Src_ip | Src_port | Dst_ip | Dst_port | Process | Protocol | Timestamp |
|---|---|---|---|---|---|---|---|
| $e_1$ | 138.15.165.26 | 19820 | 138.15.165.226 | 445 | ntoskrnl.exe | 17 (UDP) | 2016-2-29 11:30:12 |
| $e_2$ | 138.15.165.32 | 1672 | 74.125.228.17 | 80 | chrome.exe | 6 (TCP) | 2016-2-29 11:35:09 |
| $e_3$ | 138.15.165.40 | 1823 | 138.15.165.235 | 445 | ntoskrnl.exe | 17 (UDP) | 2016-2-29 11:40:56 |
| $e_4$ | 138.15.165.27 | 621 | 101.125.228.17 | 80 | chrome.exe | 6 (TCP) | 2016-2-29 11:52:19 |
| $e_5$ | 138.15.165.28 | 8203 | 138.15.165.226 | 445 | ntoskrnl.exe | 17 (UDP) | 2016-2-29 12:02:09 |
| $e_6$ | 138.15.165.41 | 7625 | 138.15.165.235 | 445 | ntoskrnl.exe | 17 (UDP) | 2016-2-29 12:04:23 |

After analyzing large amounts of real connection events in enterprise networks, the following observations can be made:

Observation 1. The dst_ips of outside connections are quite diverse, however, the dst_ips of inside connections are regular and exhibit one or more patterns. For example, the hosts belonging to the same group all connect to the private servers of the group, and they rarely connect to other groups' private servers.

Observation 2. For both inside and outside connections, there is a binding relation on the process and the dst_port. For example, chrome.exe is used to load web pages and it usually connects to the dst_ports 80 and 8080. The ntoskrn-l.exe is used for windows network neighbor discovery and it always connects to the dst_port 445.

Based on the above observations, two data structures are introduced to model the normal states of connection events in the enterprise network. The blue print graph of topology (topology graph) is used to model the source and destination relationship of the connection events inside the enterprise network. The blue print graph of process-destination-port (port graph) is used to model the relationship between process and destination ports of all the network connections.

Definition 2 (Topology Graph). The topology blue print graph $G_t=<V, E>$, where V is the node set of hosts inside the enterprise network and E is the edge set. A host node v is a 3-tuple, v=<host_id, ip, last_connection_time>; an edge l is a 4-tuple, l=<edge_id, src_ip, dst_ip, last_connection_time>.

The last_connection_time records the timestamp of the latest network connection on the node/edge. This measurement is used to update the blue print graphs. If a node/edge has no connection event for quite a long time (e.g., 2 months), the system removes such a node/edge to keep the blue print graphs up-to-date.

In the topology graph, if there is a new network connection between a pair of hosts inside the enterprise network, an edge is constructed between these two host nodes. The last_connection_time of both nodes and edges are updated as the timestamp of the connection event. Note that the topology graph does not store the total count of connection events between a pair of nodes. Since the ASI agent does not monitor the contents and traffic of the network connections, the total count of connection is not meaningful and can be misleading. In real applications, many normal processes may initialize thousands of network connection events in one second via the same edge. A large number of the total count does not indicate high traffic on the edge.

Definition 3 (Port Graph). The port blue print graph $G_p=<V_p, V_d, E>$, where $V_p$ is the node set of processes that initialize the connection, $V_d$ is the node set of the destination port, and E is the edge set. A process node $v_p$ is a 2-tuple, $v_p$=<process, last_connection_time>; a destination port node $v_d$ is a 2-tuple, $v_d$=<port, last_connection_time>; and an edge l is a 4-tuple, l=<edge_id, process, port, last_connection_time>.

The port graph is a bipartite graph. In this graph, a process node can only connect to port nodes, and vice versa. The source of the edge is always defined as the process, and the destination of the edge is always defined as the port.

In the port graph, an edge may be constructed from a source process to a destination port based on the new connection event. The last_connection_time of both nodes and edges are updated as the timestamp of the connection event.

Process 1 summarized below illustrates the detailed steps used to construct and update both graphs over the streaming data. For each new connection event, the system first checks whether the topology graph contains the source and destination host nodes, and adds the nodes if they are not contained (Steps 1 to 2). Then the system checks the edge existence between the pair of host nodes and adds a new edge if there is no edge between both nodes (Steps 3 to 4). In the next step, the last_connection_time of the edge and nodes are updated based on the event's timestamp (Step 5). The steps of updating the port graph are similar (Steps 6 to 12). Finally, the system removes outdated nodes and edges and returns the updated graphs (Steps 13 to 14). Note that this process is used for both constructing the graph models and maintaining them up-to-date. The constructed blue print graphs can be saved in files and loaded by a different analysis engine.

For example, the users may construct the graphs from one enterprise network, and load the constructed graphs on the stream of another enterprise network. The process automatically updates the blue print graphs. It does not require the users to provide any specific information of the enterprise network. Hence, it is more feasible for system deployment in real applications.

| Process 1: Constructing and Updating Blue Print Graphs | |
|---|---|
| Input: | The new arrived network connection event e, the old topology graph $G_t$ and port graph $G_p$; |
| Output: | The updated topology graphs $G_t$ and $G_p$; |
| Step 1: | Check whether $G_t$ contains the host nodes with src_ip and dst_ip of e; |
| Step 2: | If $G_t$ does not contain the node(s), add the node(s) to $G_t$; |
| Step 3: | Check whether $G_t$ contains the edge between the nodes of src_ip and dst_ip of e; |
| Step 4: | If $G_t$ does not contain the edge, add a new edge to $G_t$; |
| Step 5: | Update the last_connection_time of the corresponding nodes and edges of $G_t$; |
| Step 6: | Check whether $G_p$ contains the process nodes about connecting_process of e; |
| Step 7: | If $G_p$ does not contain the process node, add the node to $G_p$; |
| Step 8: | Check whether $G_p$ contains the destination port nodes about dst_port of e; |
| Step 9: | If $G_p$ does not contain the destination port node, add the node to $G_p$; |
| Step 10: | Check whether $G_p$ contains the edge between the process and dst_port of e; |
| Step 11: | If $G_p$ does not contain the edge, add a new edge to $G_p$; |
| Step 12: | Update the last_connection_time of the corresponding nodes and edges of $G_p$; |
| Step 13: | Remove outdated nodes and edges from $G_t$ and $G_p$; |
| Step 14: | Return $G_t$ and $G_p$; |

Detecting abnormal network connections based on the blue print graphs is now described. A flowchart 700 (FIG. 7) summarizes such process.

Figure 4:
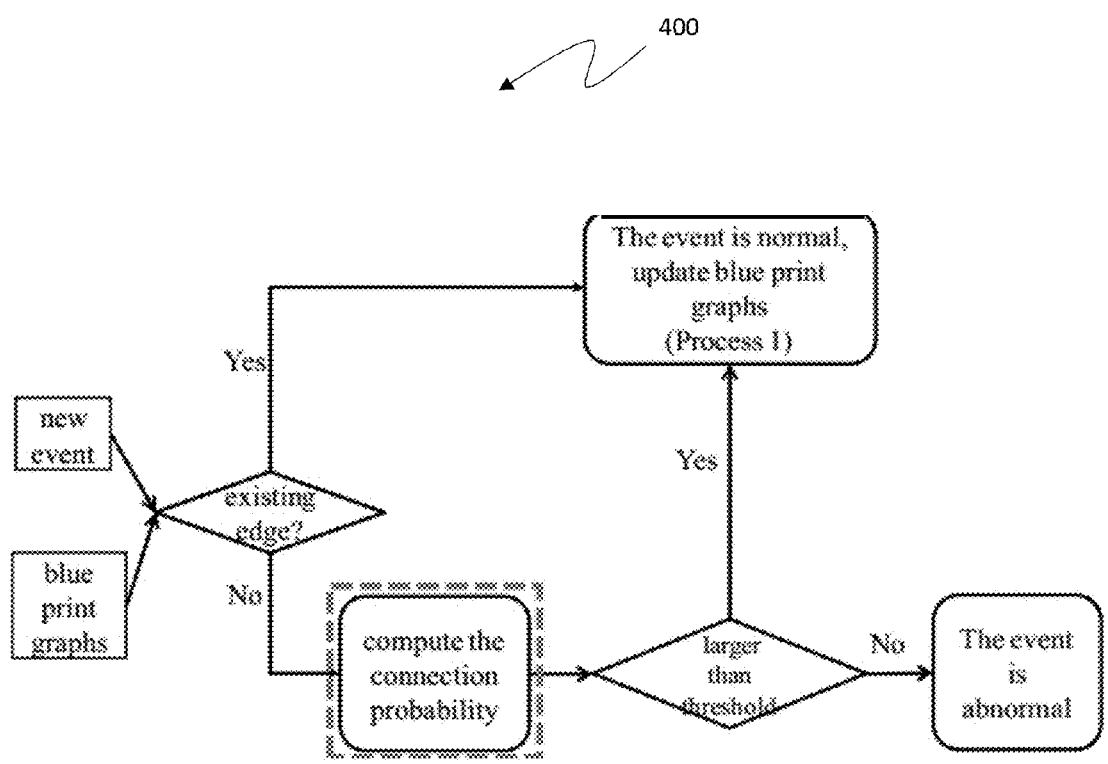
FIG. 4 is an example framework of an online anomaly detection component, in accordance with embodiments of the present invention.

The main usage of the blue print graph model is to detect abnormal network connections. FIG. 4 shows the framework of an online anomaly detection component 400. This component takes both blue print graphs and the new connection event as input. The system first matches the event to a blue print graph and checks whether the event is on an existing edge of the graph. If the event is on the existing edge, it means that a connection with the same topology/port information has been seen before, and such an event is normal. The system then updates the blue print graph based on this event. If the event cannot be matched to any edge, it means that the event has an unseen relationship. In such a case, the system needs to further compute the probability of this connection. If the probability is larger than a threshold, such an event is still normal and the system updates the blue print graph by adding a new edge based on the event. If the probability is low, it means that the connection is not likely to happen. Then, the system outputs the event as an abnormal connection.

There are three key factors in computing the connection probability for a new edge: (1) whether the source or destination node always has new edges in previous periods (node stability); (2) whether the source or destination node has many edges already (node diversity); and (3) whether the source or destination has connected to a similar node before (node similarity).

In the blue print graphs, the nodes and edges are updated based on the arriving network connection events. After a while, some nodes always have new edges, but other nodes become stable with a constant number of edges. The following measure is proposed to model the stability of a node.

Definition 4 (Node Stability). Let v be a node in the blue print graph, and m be a fixed time window length. The time period, from v is added to the blue print graph to the current timestamp and can be partitioned to a sequence of time windows, $T=\{T_0, T_1, T_2, \ldots T_n\}$, where $T_i$ is a time window with length m. If there is no new edge from/to node v in window $T_i$, $T_i$ is defined as a stable window. The node stability is thus defined in Eqs. 1 and 2, where $|T_{from}'|$ is the count of stable windows in which no edge connects from v, $|T_{to}'|$ is the count of stable windows in which no edge connects to v, and $|T|$ is the total number of windows.

$$\sigma_{src}(v)=|T_{from}'|/|T| \quad \text{Eq. 1}$$

$$\sigma_{dst}(v)=|T_{to}'|/|T| \quad \text{Eq. 2}$$

There are two stability scores for each node, since a node that is not stable as a source may be stable as a destination. For example, a host may constantly have new edges from it, however, there is no other host that connects to it. In such a case, even the host has very low stability as a source and its stability score is very high as a destination. If there is suddenly a connection to this host, it is considered abnormal.

The range of node stability is [0,1], when a node has no stable window, i.e., the node always has new edges in every window, the stability is 0. If all the windows are stable, the node stability is 1.

In real applications, the window length is set to 24 hours (a day). Hence the stability of a node is determined by the days that the node has no new edges and the total number of days. Note that, the node stability can be easily maintained over the stream, the system only stores three numbers of $|T_{from}'|$, $|T_{to}'|$ and $|T|$ for each node, and updates in every 24 hours. The time complexity of computing node stability is O(1).

In the blue print graph, some nodes have many edges, e.g., a public server in the topology graph may have edges to hundreds of hosts. Thus, the probability is much higher for this node to have more new edges.

Definition 5 (Node Diversity). Let v be a node in the topology graph, $E_{from}(v)$ be the set of edges that connect from v and $E_{to}(v)$ be the set of edges that connect to v, the node diversity is defined in Eqs. 3 and 4, where $|V|$ is the size of the node set in the topology graph.

$$\theta_{src}(v)=|E_{from}(v)|/(|V|-1) \quad \text{Eq. 3}$$

$$\theta_{dst}(v)=|E_{to}(v)|/(|V|-1) \quad \text{Eq. 4}$$

The range of node diversity in the topology graph is [0,1]. For a node without any edge, the diversity is 0, and if the node connects to every other node in the graph, the diversity is 1.

The port graph is a bipartite graph. For each edge in the port graph, the source is always a process node and the designation is always a port node. The process node diversity $\theta_{src}(v_p)$ and port node diversity $\theta_{dst}(v_d)$ are defined by Eqs. 5 and 6, where $|V_d|$ is the size of the port node set and $|V_p|$ is the size of the process node set.

$$\theta_{src}(v_p)=|E_{from}(v)|/|V_d| \quad \text{Eq. 5}$$

$$\theta_{dst}(v_d)=|E_{to}(v)|/|V_p| \quad \text{Eq. 6}$$

The range of node diversity in the port graph is also [0,1]. If a process connects to all the ports, or a port has connections from every process, the node diversity reaches the maximum as 1.

The node diversity can also be efficiently computed over the stream. The system stores a total number of edges from/to each node, and updates the number when a new edge is added to the graph. The time complexity of computing the node diversity is O(1).

Beside stability and diversity, the main factor of connection probability computation is the node similarity, which indicates whether the source/destination has connected to similar nodes before.

Definition 6 (Node Similarity). Let $v_1$ and $v_2$ be two nodes of the same type in the blue print graph, dst(v) and src(v) denote the destinations/sources that have edges from/to v. The node similarity is defined as Eqs. 7 and 8.

$$\gamma_{src}(v_1, v_2) = \frac{dst(v_1) \cap dst(v_2)}{dst(v_1) \cup dst(v_2)} \quad \text{Eq. 7}$$

$$\gamma_{dst}(v_1, v_2) = \frac{src(v_1) \cap src(v_2)}{src(v_1) \cup src(v_2)} \quad \text{Eq. 8}$$

Note that, $v_1$ and $v_2$ must be the same type, i.e., they are both host nodes in the topology graph, or both are process nodes or port nodes in the port graph. The source similarity (Eq. 7) between the two nodes is indeed the Jaccard similarity of their destinations, and the destination similarity (Eq. 8) is the Jaccard similarity of the sources that have connected to both nodes. The range of node similarity is [0,1]. If both nodes have the same sources/destinations in the blue print graph, their similarity is 1, if they have no common source/destinations, the similarity is 0.

Based on the above three measures, the connection probability can be defined as follows.

Definition 7 (Connection Probability). Let e be a new connection event, G be a blue print graph, $v_1$ and $v_2$ be source and destination nodes when matching e to G, the connection probability, p(e|G), is defined as shown in Eq. 9, where $\varphi_{src}(v_1)$, $\varphi_{dst}(v_2)$ are the source and destination abnormal scores of $v_1$ and $v_2$, which are computed in Eqs. 10 and 11.

$$p(e|G)=1-\max(\varphi_{src}(v_1),\varphi_{dst}(v_2)) \quad \text{Eq. 9}$$

The abnormal score of source node $v_1$ is computed as shown in Eq. 10, where $\sigma(v_1)$ is the node stability, $\theta_{src}(v_1)$ is the node diversity and dst($v_1$) is the node set of destination that $v_1$ has connected to in the blue print graph G. Similarly, the abnormal score of destination node $v_2$ is computed in Eq. 11, where src($v_2$) is the source node set that has connection to $v_2$.

$$\varphi_{src}(v_1)=\sigma_{src}(v_1)*(1-\theta_{src}(v_1))*(1-\max_{v_j \in dst(v_1)}\gamma_{dst}(v_2,v_j)) \quad \text{Eq. 10}$$

$$\varphi_{dst}(v_2)=\sigma_{dst}(v_2)*(1-\theta_{dst}(v_2))*(1-\max_{v_j \in src(v_2)}\gamma_{src}(v_1,v_j)) \quad \text{Eq. 11}$$

Note that the measure of node similarity is different from the measures of stability and diversity. The stability and diversity is defined on a single node, but the similarity is a score computed by comparing two nodes. In Eq. 10, the node similarity is compared between $v_2$ and every historical destination of $v_1$, and uses the maximum to compute the abnormal score. The intuition is that, if one can find one node that $v_1$ has connected in history with high similarity to $v_2$, then the connection probability between $v_1$ and $v_2$ is high.

Figure 5:
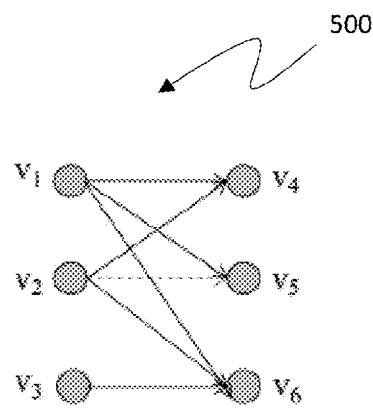
FIG. 5 is an example of node similarity, in accordance with embodiments of the present invention.

Example 2. FIG. 5 shows a small blue print graph 500 with six nodes. The edge from node $v_2$ to $v_5$ is a new edge. To compute the abnormal score $\varphi(v_2)$, the system needs to check the node similarity between $v_5$ and the old destination nodes that $v_2$ has connected before ($v_4$ and $v_6$).

Based on Eq. 6, $\gamma_{dst}(v_4, v_5)=\frac{1}{2}=0.5$, $\gamma_{dst}(v_4, v_5)=\frac{1}{3}=0.33$. $v_4$ is more similar to $v_5$ than $v_1$.

Thus, the system uses $\gamma_{dst}(v_4, v_5)$ to compute $\varphi(v_2)$.

Compared to node stability and node diversity, the computation cost of node similarity is much higher. Let n be the total number of nodes in the graph. In the worst case scenario, if every pair of nodes in the blue print graph are connected, the system has to check n−1 nodes for one round of comparison, and the comparison has to carry out for n−1 times, the total time complexity is $O(n^2)$.

In order to process such big streaming data, the computation of node similarity must be done in real time. Fortunately, the following theorem provides a way to significantly reduce the computation cost.

Theorem 1. Let e be a new connection event, G be a blue print graph, $v_1$ and $v_2$ be source and destination nodes when matching e to G, the lower-bound of connection probability, $p_{low}(e|G)$, is defined as shown in Eq. 12, where $\varphi_{src}^{upp}(v_1)$, $\varphi_{dst}^{upp}(v_2)$ are the upper-bounds of $v_1$ and $v_2$'s abnormal scores, which are computed in Eqs. 13 and 14.

$$p_{low}(e|G)=1-\max(\varphi_{src}^{upp}(v_1),\varphi_{dst}^{upp}(v_2)) \quad \text{Eq. 12}$$

$$\varphi_{src}^{upp}(v_1)=\tau_{src}(v_1)*(1-\theta_{src}(v_1)) \quad \text{Eq. 13}$$

$$\varphi_{dst}^{upp}(v_2)=\sigma_{dst}(v_2)*(1-\theta_{dst}(v_2)) \quad \text{Eq. 14}$$

Proof: Since the node similarity score, $\gamma_{dst}(v_2, v_i)$ is in the value range of [0,1]. And $(1-\max_{v_i \in dst(v_1)}\gamma_{dst}(v_2, v_i))$ is still in the value range of [0,1].

$$\varphi_{src}(v_1)=\sigma_{src}(v_1)*(1-\theta_{src}(v_1))*(1-\max_{v_i \in dst(v_1)}\gamma_{dst}(v_2,v_i)) \leq \sigma_{src}(v_1)*(1-\theta_{src}(v_1))$$

Therefore, $\varphi_{src}^{upp}(v_1)=\sigma_{src}(v_1)*(1-\theta_{src}(v_1))$.

Similarly, it can be proved that $\varphi_{dst}^{upp}(v_2)=\sigma_{dst}(v_2)*(1-\theta_{dst}(v_2))$.

Note that, the node stability and diversity can be computed in O(1) time. Therefore, the system can efficiently compute the lower bound of connection probability $p_{low}(e|G)$ on streaming data. If $p_{low}(e|G)$ is larger than or equal to the given threshold, the connection event is definitely normal. The system can just let it go without further computation. Only when $p_{low}(e|G)$ is less than the given threshold, the system needs more detailed computation of $p(e|G)$ to further decide whether e is abnormal or not. Thus, the time cost is reduced significantly by adding a filter based on $p_{low}(e|G)$.

Process 2 shows the detailed steps of online anomaly detection. The system takes the connection event, two blue print graphs and a threshold of connection probability as input, and outputs the abnormal labels of the event. The system first matches the event to the topology graph, if the event is an existing edge, the topology abnormal label is false (i.e., the event is normal in topology perspective) (Steps 1 to 2). If the event is a new edge, the system computes the lower bound of connection probability, if the lower bound is already larger than or equal to the threshold, the topology abnormal label is still false (Steps 4 to 5). Only when the lower bound is less than the threshold, the system computes the connection probability and compares the result with the threshold. If the probability is larger than the threshold, the topology abnormal label is false, otherwise it is true (Steps 6 to 11). Finally, if the topology abnormal label is false, the system updates the topology graph based on this normal event (Step 12). Similarly, the system checks the event with the port graph to compute the abnormal port label (Steps 13 to 24). Finally, both labels are returned as output.

---

Process 2: Online Anomaly Detection

Input: The connection event e, the topology graph $G_t$ and port graph $G_p$, the connection probability threshold $\delta$
Output: The label of is_topology_abnormal(e), is_port_abnormal(e);
Step 1: Match e to topology graph $G_t$;
Step 2: If e is via an existing edge of $G_t$, is_topology_abnormal(e) ← false;
Step 3: Else
Step 4: {Compute $p_{low}(e|G_t)$ based on Eq. 12;
Step 5: If $p_{low}(e|G_t) \geq \delta$, is_topology_abnormal(e) ← false;
Step 6: Else{
Step 7: Compute p(e|$G_t$) based on Eq.9;
Step 8: If p(e|$G_t$) ≥ δ, is_topology_abnormal(e) ← false;
Step 9: Else is_topology_abnormal(e) ← true;
Step 10: }
Step 11: }
Step 12: If is_topology_abnormal(e) = false, update topology graph $G_t$ with e;
Step 13: Match e to port graph $G_d$;
Step 14: If e is via an existing edge of $G_d$, is_port_abnormal(e) ← false;
Step 15: Else
Step 16: {Compute $p_{low}(e|G_d)$ based on Eq. 12;
Step 17: If $p_{low}(e|G_d) \geq \delta$, is_port_abnormal(e) ← false;
Step 18: Else{
Step 19: Compute p(e|$G_d$) based on Eq.9;
Step 20: If p(e|$G_d$) ≥ δ, is_port_abnormal(e) ← false;
Step 21: Else is_port_abnormal(e) ← true;
Step 22: }
Step 23: }
Step 24: If is_port_abnormal(e) = false, update port graph $G_d$ with e;
Step 25: Return is_topology_abnormal(e), is_port_abnormal(e);

---

Regarding constructing and modeling of the enterprise network, traditional methods cannot construct both the topology and port graphs on streaming data. Specifically, the port graph (A2), is a new model for the relationship between the process and the destination port.

Regarding real-time anomaly detection, traditional methods do not consider the three measurements for connection probability, especially the node stability and node similarity measures.

In conclusion, the exemplary embodiments model the enterprise network by blue print graphs. The blue print graph model is a complete and multi-dimensional model for the complex enterprise network. The graph construction and updating methods enable the system to quickly build and maintain the models over streaming data. Since the method does not require any prior knowledge, it is especially feasible for real deployment. The three measurements and connection probability are the main factors used for determining whether a new connection is abnormal or not. These measures have higher accuracy than the measures proposed in related works. The proposed method can significantly reduce the computational cost of node similarity measures. Only with this method, the node similarity measures can be computed over the streaming data, and the abnormal event detection can be carried out in real time. The overall framework of using the blue print graphs and connection probability for abnormal network connection detection serves as the core component in the ASI analysis engine.

This component has better accuracy in detecting abnormal network connections caused by, e.g., hacker attacks, malwares or viruses.

The proposed method has several advantages over conventional intrusion detection methods. (1) The proposed blue print graph models are constructed and maintained over the data stream. (2) The exemplary methods do not need predefined values and statistical rules for abnormal detection. (3) The proposed method can provide an explanation regarding the abnormal event based on the blue print graph models, e.g., the abnormal event has an unseen relationship on process database.exe connections to the destination port.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for real-time detecting of abnormal network connections, the method comprising:
   collecting network connection events from at least one agent connected to a network;
   recording, via a topology graph, normal states of network connections among hosts in the network; and
      recording, via a port graph, relationships established between host and destination ports of all network connections;
   wherein, for each connection event, if no edge exists, compute a connection probability for a new edge.

2. The method of claim 1, wherein, if the connection probability is greater than a predetermined threshold, update the topology graph and the port graph.

3. The method of claim 1, wherein, if the connection probability is less than a predetermined threshold, return an indication for an abnormal connection.

4. The method of claim 1, wherein the connection probability is based on whether the host or destination nodes:
   always have new edges in previous periods;
   have several edges already; and
   have connected to a similar node before.

5. A system for real-time detecting of abnormal network connections, the system comprising:
   a memory; and
   a processor in communication with the memory, wherein the processor is configured to:
      collect network connection events from at least one agent connected to a network;
      record, via a topology graph, normal states of network connections among hosts in the network; and
      record, via a port graph, relationships established between host and destination ports of all network connections;
   wherein, for each connection event, if no edge exists, compute a connection probability for a new edge.

6. The system of claim 5, wherein, if the connection probability is greater than a predetermined threshold, update the topology graph and the port graph.

7. The system of claim 5, wherein, if the connection probability is less than a predetermined threshold, return an indication for an abnormal connection.

8. The system of claim 5, wherein the connection probability is based on whether the host or destination nodes:
   always have new edges in previous periods;
   have several edges already; and
   have connected to a similar node before.

9. The system of claim 5, wherein, for each connection event, check whether the topology graph includes source and destination host nodes.

10. The system of claim 9, wherein, for each connection event, check whether edges exist between pairs of host nodes.

11. The system of claim 10, wherein outdated nodes and edges are removed.

12. A non-transitory computer-readable storage medium comprising a computer-readable program for real-time detecting of abnormal network connections, wherein the computer-readable program when executed on a computer causes the computer to perform the steps of:
   collecting network connection events from at least one agent connected to a network;
   recording, via a topology graph, normal states of network connections among hosts in the network; and
      recording, via a port graph, relationships established between host and destination ports of all network connections;
   wherein, for each connection event, if no edge exists, compute a connection probability for a new edge.

13. The non-transitory computer-readable storage medium of claim 12, wherein, if the connection probability is greater than a predetermined threshold, update the topology graph and the port graph.

14. The non-transitory computer-readable storage medium of claim 12, wherein, if the connection probability is less than a predetermined threshold, return an indication for an abnormal connection.

15. The method of claim 1, wherein, for each connection event, check whether the topology graph includes source and destination host nodes.

16. The method of claim 15, wherein, for each connection event, check whether edges exist between pairs of host nodes.

17. The method of claim 16, wherein outdated nodes and edges are removed.

* * * * *